United States Patent [19]

Syson et al.

[11] 3,870,667
[45] Mar. 11, 1975

[54] SURFACE COATING COMPOSITIONS WHICH COMPRISE ALKYD RESIN AND NON-AROMATIC PETROLEUM RESIN

[75] Inventors: John William Syson; John Charles Kerridge, both of Stockton-On-Tees, England

[73] Assignee: Imperial Chemical Industries Limited, London, England

[22] Filed: June 4, 1973

[21] Appl. No.: 366,979

[30] Foreign Application Priority Data
June 15, 1972  Great Britain.................... 28070/72

[52] U.S. Cl...... 260/22 CB, 117/132 R, 117/161 K, 260/33.6 UA
[51] Int. Cl. .................... C09d 3/66, C09d 11/00
[58] Field of Search ................................. 260/22 CB

[56] References Cited
UNITED STATES PATENTS
2,404,836  7/1946  Gerhart et al. ................. 260/22 CB
3,088,927  5/1963  Dissen ............................ 260/22 CB
3,389,015  6/1968  Scala et al. ..................... 260/22 CB
3,594,341  7/1971  Bata et al....................... 260/28.5 A
3,600,348  8/1971  Humphrey et al............. 260/28.5 A
3,786,008  1/1974  Piiroya et al. .................. 260/22 CB

OTHER PUBLICATIONS

Patton, Alkyd Resin Technology Formulating Techniques and Allied Calculations, Interscience Publishers, N.Y. N.Y., 1962, Pg. 16–26.

*Primary Examiner*—Ronald W. Griffin
*Attorney, Agent, or Firm*—Cushman, Darby & Cushman

[57]  ABSTRACT

A surface coating composition comprises an alkyd resin, a solvent and a non-aromatic petroleum resin, suh as is obtained by polymerising a hydrocarbon fraction boiling between −10° and 80°C which has been distilled from a steam cracked naphtha or gas oil.

9 Claims, No Drawings

SURFACE COATING COMPOSITIONS WHICH COMPRISE ALKYD RESIN AND NON-AROMATIC PETROLEUM RESIN

The present invention relates to surface coating compositions.

Surface coatings have a practical as well as a decorative function in as much as they protect the surface to which they are applied. To achieve this end it is desirable that the surface coating dries quickly and thoroughly throughout its thickness and that the finished film should be tough and have a satisfactory compromise between hardness and flexibility. We have found that although the "through-dry" and hardness of the film may be improved by the incorporation of hydrocarbon resins into the surface coating, its decorative properties suffer because the coating shows an increased tendency to yellow in ultra-violet light. We have also found, however, that this yellowing may be minimised by suitable choice of hydrocarbon resin.

According to the invention a surface coating composition comprises an alkyd resin, a solvent, and a non-aromatic petroleum resin.

The non-aromatic petroleum resin is a hydrocarbon resin which is obtained by polymerising a suitable petroleum fraction substantially free from aromatic hydrocarbons, i.e. containing at most 5% by weight aromatics, preferably at most 2% by weight. Preferably the fraction is a fraction derived from a steam-cracked naphtha or gas oil by distillation and boiling within the range −10 to 80°C. The fraction may contain one or more of the following hydrocarbons:- butene-1, butene-2, isobutene, isoprene, cis- and trans- piperylene, n-pentane, iso-pentane, pentene-1, cyclopentadiene, dicyclopentadiene, trans-pentene-2, 2-methylbutene-2, cyclopentane and cyclopentane. This feedstock may be polymerised directly or it may be subjected to a pretreatment, e.g. the cyclopentadiene may be removed by heating the fraction at 100° to 160°C to cause the cyclopentadiene to dimerise to dicyclopentadiene from which the remainder of the fraction is separated by distillation. In another form of pretreatment the fraction may be heated to a temperature of at least 160°C, preferably 160° to 200°C for a period of up to 5 hours as described in our co-pending British Patent Application Nos. 42768/70 (equivalent Belgian Pat. No. 772,318) and 58225/71 (equivalent Belgian Pat. No. 792,517). This form of pretreatment may be carried out with or without removal of the cyclopentadiene.

The polymerisation of the petroleum fraction is preferably catalysed by a Friedel-Crafts catalyst which may suitably be an inorganic halide or an inorganic strong acid. Inorganic halides are generally preferred and include halides of aluminium, iron, tin, boron, zinc, antimony and titanium. The inorganic halide is advantageously used in conjunction with a hydrogen halide such as hydrogen chloride or hydrogen bromide. For example, treatment with aluminium chloride preferably complexed with hydrogen chloride in an aromatic solvent such as toluene or a xylene produces a solution from which the resin may be recovered. Preferably, however, the Friedel Crafts catalyst is used in an aromatic solvent which is a benzene which is liquid at the temperature of the polymerisation and which is substituted by at least one secondary or tertiary alkyl group or by a cycloalkyl group, e.g. tert.butyl benzene, p-cymene, p-isobutyl toluene, p-ethyl-tert.-amyl benzene or, in particular, cumene. Such catalysts are described in our co-pending British Patent Application No. 5097/71 (equivalent Belgian Pat. No. 779,454) a complex of aluminium chloride, cumene and hydrogen chloride being preferred. The polymerisation of the petroleum feedstock is preferably carried out at a temperature of −100° C to +200°C, more preferably 50° to 100°C under atmospheric pressure or a positive pressure, e.g. up to 700 p.s.i.g., using a catalyst concentration of 0.05 to 5%, preferably 0.5 to 1.5% by weight of the feedstock. The catalyst is finally broken down and removed from the resin by treatment, for example with alcoholic ammonia, aqueous alkali or aqueous alcohol followed by one or more washes with water and, optionally, a steam distillation to remove residual monomers. Suitable alcohols are alkanols containing 1 to 4 carbon atoms, e.g. isopropanol and suitable alkalis are the alkali metal hydroxides such as sodium hydroxide.

The polymerisation is preferably carried out continuously, more preferably by passage through a plurality of alternating polymerisation and cooling zones in which catalyst is added to each polymerisation zone. Such a process is described in our co-pending British Patent Application No. 58226/71 (equivalent Belgian Pat. No. 792,518). The removal of the catalyst and the final washing of the polymer may also be carried out continuously, e.g. in a series of mixers and settlers. The polymer is finally stripped of residual $C_5$ stream hydrocarbons, e.g. by a steam distillation, and is then ready for use.

The alkyd which is used in the surface coating composition may be chosen from the wide range known to those acquainted with the art. Thus the alkyd may be derived by partial acidolysis or alcoholysis of a fatty acid glyceride such as soya beam oil, linseed oil, dehydrated castor oil, tung oil or fish oil with a di- or polybasic acid or a di- or poly-hydric alcohol followed by reaction of the acidolysis product with a di- or polyhydric alcohol, or the alcoholysis product with a di- or poly-basic acid. The acid may be an aromatic dibasic acid such as o-phthalic acid, isophthalic acid or terephthalic acid or an aliphatic acid such as maleic or fumaric acid. Suitable di- and poly-hydric alcohols include the glycols such as ethylene glycol, diethylene glycol, propylene glycol, dipropylene glycol or neopentyl glycol and polyhydric alcohols such as glycerol, pentaerythritol, dipentaerythritol or sorbitol. A monobasic acid may also be used in the production of the alkyd, such an acid preferably being an aliphatic acid having a carbon chain length of 8 to 20 carbon atoms, e.g. tall oil fatty acids, pelargonic acid or isodecanoic acid.

It is preferred that the alkyd used in the composition should itself be resistant to yellowing in ultra-violet light. Such alkyds are those which do not contain conjugated double bond systems and are thus preferably derived, for example, from soya bean oil rather than from linseed oil. The non-conjugated alkyds, however, have less effective "through-dry" and hardness properties than the conjugated variety and the use of a hydrocarbon resin in accordance with the present invention has the advantageous effect of improving such properties without adversely affecting the resistance of the surface coating to yellowing.

The solvent which is used in the surface coating composition according to the present invention is preferably a hydrocarbon solvent which may be aromatic, aliphatic or cycloaliphatic in nature. Suitable solvents include, toluene, xylenes and higher methyl, ethyl or propyl benzenes, $C_6$ to $C_{12}$ alkanes, white spirit, cyclohexane, alkyl substituted cyclohexanes and turpentine. The preferred solvent is white spirit.

A pigment may also be included in the surface coating composition and may be any one of those commonly used to produce a desired colour in such formulations. For example, inorganic pigments such as titanium dioxide are very popular.

The surface coating composition according to the invention preferably contains 25 to 85% by weight of alkyd plus petroleum resin and the petroleum resin is preferably 5 to 15% by weight of the alkyd. The balance of the composition is solvent with any other additives such as pigments, drying agents, e.g. metallic driers such as cobalt salts and anti-skinning agents, e.g. methyl ethyl ketoxime.

The surface coating composition may be made up by conventional milling and mixing techniques, e.g. by use of a ball mill. The invention will now be further described by reference to the following Examples.

EXAMPLE 1

A composition typical of the present invention was made up by milling in a ball mill the following components:-

| | |
|---|---|
| Titanium dioxide | : 30 grams |
| "PARALAC" 40 W (a long oil, semi-drying oil - modified alkyd) | : 37.5 grams |
| "IMPREZ" 100 (petroleum resin) | : 3.75 grams |
| White Spirit | : Sufficient to bring the viscosity of the mixture to a consistency suitable for application (approximately 35 grams). |

N.B.: "PARALAC" and "IMPREZ" are trademarks.

EXAMPLE 2

In general, paint formulations were prepared by mixing together alkyd resin, a white spirit solution of "IMPREZ" 100 and white spirit to form a "varnish" and then stirring into this mixture a stabilised mill base. Driers, comprising 0.05% by weight cobalt naphthenate 0.5% by weight zirconium naphthenate and 0.25% calcium naphthenate (all calculated as metal based on the solid alkyd resin) were added to complete the preparation and each paint was allowed to age for at least three days before thinning with white spirit to the correct viscosity for application.

The mill base comprised a mixture of:-

| | |
|---|---|
| Titanium dioxide | : 700 grams |
| Alkyd resin in white spirit (70% non-volatiles) | : 65 grams |
| White spirit | : 235 grams | which was thoroughly mixed in a ball mill for 16 hours and then stabilised by adding a further 135 grams of alkyd resin in solution in white spirit (70% non-volatiles) and mixing in a ball mill for a further 15 minutes.

Four commercially available alkyd resins were used in the formulations. They were:-

| | |
|---|---|
| RESIN A | : "PARALAC" 40W a long oil, semi-drying modified alkyd resin containing pentaerythritol, |
| RESIN B | : "PARALAC" 10W a long oil, linseed oil modified alkyd resin containing pentaerythritol, |
| RESIN C | : "PARALAC" 64X a short-medium oil length drying caster oil-modified alkyd resin, |
| RESIN D | : "BEDACRYL" 3X a drying oil alkyd resin modified with polymethacrylic ester. (BEDACRYL is a trademark). |

The following formulations were made up:-

| | E | F | G | H | I |
|---|---|---|---|---|---|
| Alkyd resin in white spirit (70% non-volatiles) | 90.0 | 84.6 | 79.3 | 68.6 | 36.4 |
| "IMPREZ" 100 white spirit (50% non-volatiles) | 0.00 | 7.5 | 15.0 | 30.0 | 75.0 |
| Stabilised millbase | 97.3 | 97.3 | 97.3 | 97.3 | 97.3 |
| White spirit | 8.6 | 7.0 | 5.3 | — | — |
| Ratio total alkyd resin : petroleum resin | 100:0 | 95:5 | 90:10 | 80:20 | 50:50 |

Drying Properties

The through drying times of the paint formulations were measured using a Beck Koller drying time recorder. A description of this machine and its method of operation is to be found on page 50 in the "Paint Technology Manuals Part 5 — The Testing of Paints" published in 1965 on behalf of the Oil and Colour Chemists Association.

The following results are for Resin A.

| Formulation No. | Drying time in hours for wet film thickness | |
|---|---|---|
| | 0.0015 inch | 0.003 inch |
| E | 3.5 | 5 |
| F | 4 | 5.25 |
| G | 3.5 | 3.5 |
| H | 3.5 | — |
| I | 2.75 | 3.5 |

Hardness Testing

The hardness of paint films made from paints containing Resin A was measured by the Sward Rocker test (Paint Technology Manuals Part 5, page 72). The results were as follows:-

| Time after application | 2 days | | 19 days | |
|---|---|---|---|---|
| Wet film thickness | 0.004 ins. | 0.010 ins. | 0.004 ins. | 0.010 ins. |
| Formulation E | 13.5 | 8.7 | 26.3 | 17.4 |
| Formulation F | 22.6 | 9.1 | 36.1 | 23.8 |

The hardness figures are expressed as a percent of a standard glass plate.

Chemical Resistance Tests

Mild steel panels coated with the paint formulations E to I were soaked in distilled water for 24 days. After this time the paints containing the 'IMPREZ' resin showed smaller blisters and less overall blistering than the formulation E without the 'IMPREZ' resin. Rusting at scratches out into the paint films was about the same in all cases. Paint films soaked in a 3% brine solution again showed that the paints containing 'IMPREZ' resin gave less blistering than the control.

Alkali resistance of the paint formulations was also increased by the inclusion of 'IMPREZ' 100 resin. Dried films tested to ASTM D1647.21 showed a greater resistance to film breakdown than the control.

EXAMPLE 3

Paint formulations were made up as in Example 2 to the formulations given in the following Table. Their drying properties, measured by the Beck Keller drying time recorder, are also recorded in the Table.

| Paint Formulation | | J | K | L | M |
|---|---|---|---|---|---|
| Resin B in white spirit (75% non-volatiles) | | 57.5 | 51.75 | 57.5 | 51.75 |
| IMPREZ 100 in white spirit (75% non-volatiles) | | — | 5.75 | — | 5.75 |
| Titanium dioxide | | 34.6 | 34.6 | 31.1 | 31.1 |
| Monastral Fast Green GNS | | — | — | 3.5 | 3.5 |
| White spirit | | 7.9 | 7.9 | 7.9 | 7.9 |
| Drying time in hours | | | | | |
| Wet film thickness | 0.0015 in. | 1.75 | 1.75 | 12 | 6 |
| do. | 0.003 in. | 3 | 3.5 | 12 | 6.5 |

EXAMPLE 4

Coloured paint formulations were prepared as in Example 2 with a pigment to binder ratio of 0.8:1, the binder system being Resin A with progressive amounts of 'IMPREZ' 100 ranging from 0 to 50% by wt. The colours used were yellow, green, blue and grey, the tinting being carried out to the following ratios:-

| COLOUR | TITANIUM DIOXIDE | COLOURED PIGMENT |
|---|---|---|
| Yellow | 10 | 1 (Middle chrome) |
| Green | 10 | 1 (Phthalocyanine) |
| Blue | 25 | 1 (Phthalocyanine) |
| Grey | 10 | 1 (Carbon black) |

In no case was a pigmentation defect introduced or accentuated by the inclusion of 'IMPREZ' 100.

The blue paint and a white paint analogue, both based on resins BC and D as well as A were painted onto glass plates and exposed for 12 months in rural and industrial environments. Colour retention and resistance to chalking of paint films containing 'IMPREZ' 100 were equivalent to the controls in all cases.

What is claimed is:

1. A surface coating composition which comprises a mixture of an alkyd resin, an aromatic, aliphatic or cycloaliphatic hydrocarbon solvent and a non-aromatic petroleum resin which is the product of polymerization of a petroleum fraction boiling in the range −10° to 80°C. derived from a steam cracked naphtha or gas oil and containing more than one hydrocarbon selected from the group consisting of butene-1, butene-2, isobutene, isoprene, cis-piperylene, trans-piperylene, n-pentane, isopentane, pentene-1, cyclopentadiene, dicyclopentadiene, transpentene-2, 2-methylbutene-2, cyclopentene and cyclopentane and wherein the composition contains 25 to 85% by weight alkyd plus petroleum resin and the petroleum resin is 5 to 15% by weight of the alkyd.

2. The composition of claim 1 in which the petroleum fraction contains more than one hydrocarbon selected from the group consisting of isoprene, cis and transpiperylene, pentene-1, cyclopentadiene, dicyclopentadiene, trans-pentene-2, 2-methylbutene-2 and cyclopentene.

3. The composition of claim 1 in which the petroleum fraction is polymerised using a Friedel Crafts catalyst.

4. The composition of claim 1 in which the alkyd resin is obtained by the partial acidolysis or alcoholysis of a fatty acid glyceride with a di- or polybasic acid or a di- or polyhydric alcohol followed by reaction of the acidolysis product with a di- or polyhydric alcohol and the alcoholysis product with a di- or polybasic acid.

5. The composition of claim 4 in which the fatty acid glyceride is soya bean oil, dehydrated castor oil, tung oil or fish oil.

6. The composition of claim 4 in which the acid is o-phthalic acid, isophthalic acid, terephthalic acid, maleic acid or fumaric acid.

7. The composition of claim 4 in which the alcohol is ethylene glycol, diethylene glycol, propylene glycol, dipropylene glycol, neopentyl glycol, glycerol, pentaerythritol, dipentaerythritol or sorbitol.

8. The composition of claim 4 in which a monobasic acid is used in the production of the alkyd.

9. The composition of claim 1 in which the hydrocarbon solvent is selected from toluene, xylenes, methyl benzenes, ethyl benzenes, propylbenzenes, $C_6 - C_{12}$ alkanes, white spirit, cyclohexane, alkyl-substituted cyclohexanes, and turpentine.

* * * * *